Sept. 24, 1957  J. B. RODMAN  2,807,197
APPARATUS FOR CUTTING FLATTENED CONTAINERS
Original Filed Feb. 17, 1955  10 Sheets-Sheet 7
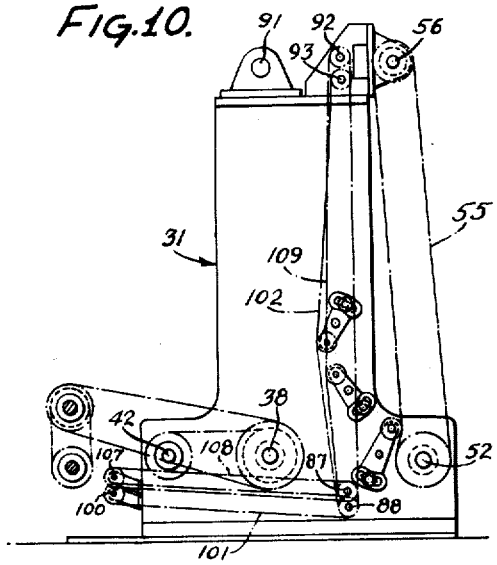
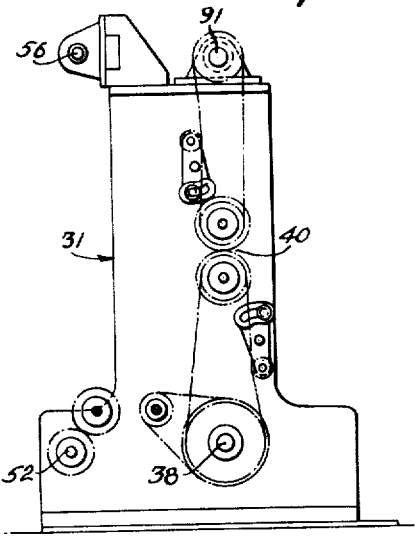
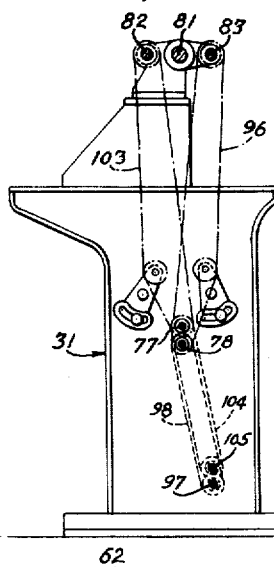
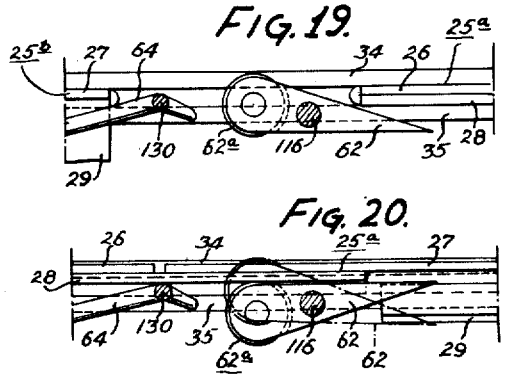
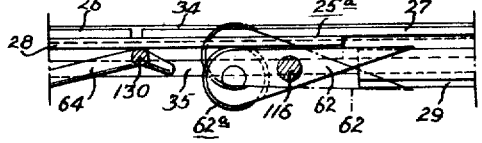
Inventor:
James B. Rodman
by Merriam & Lorch
Attys.

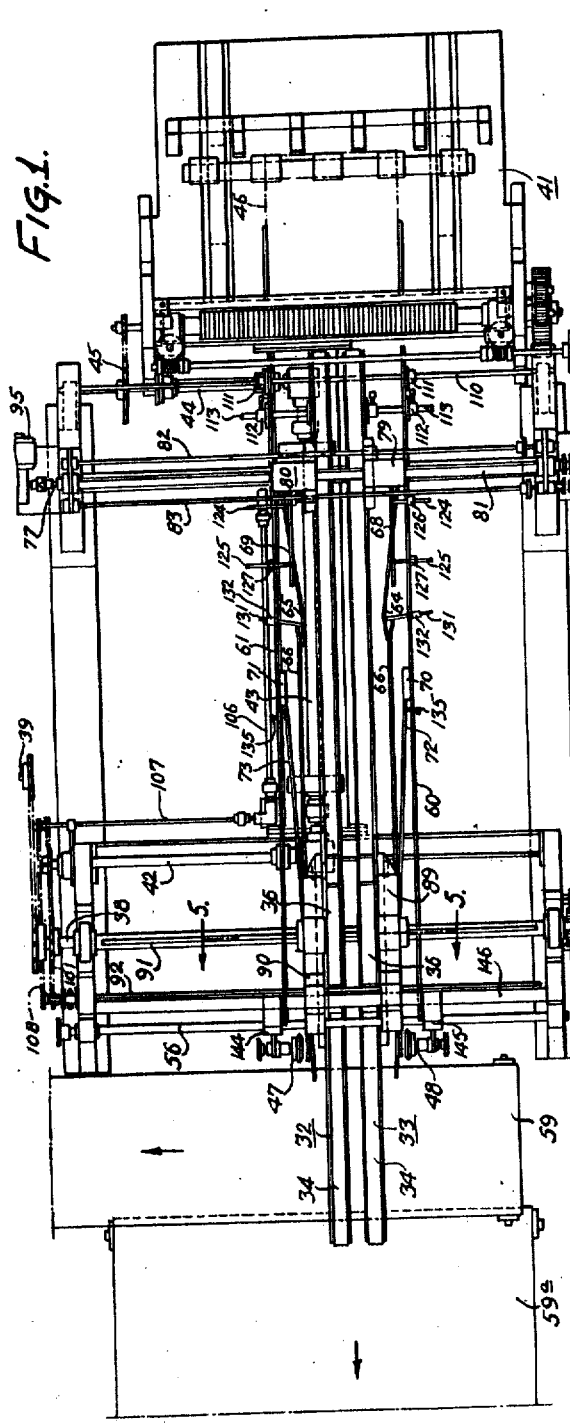

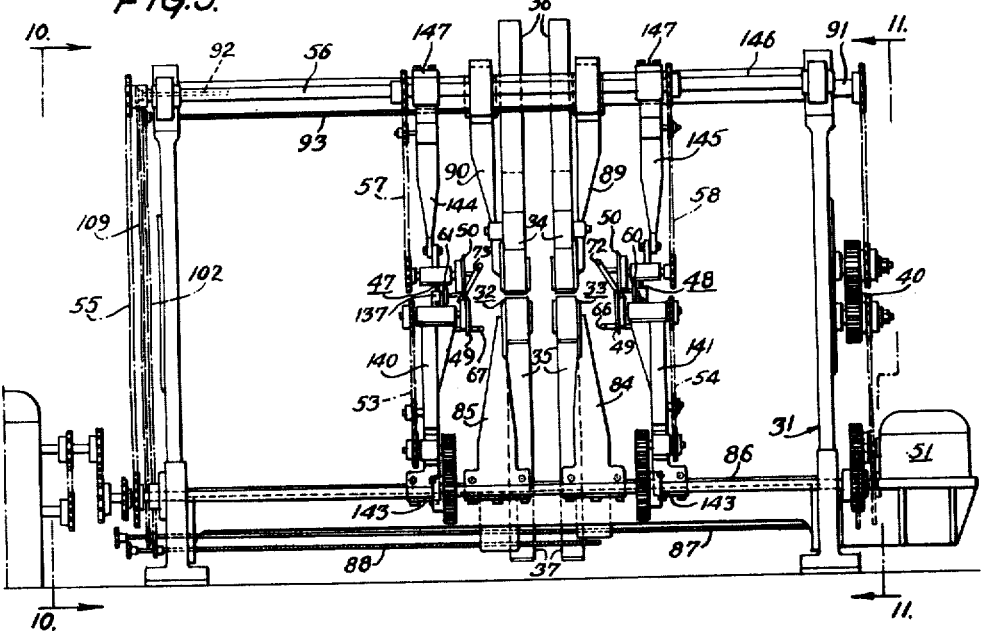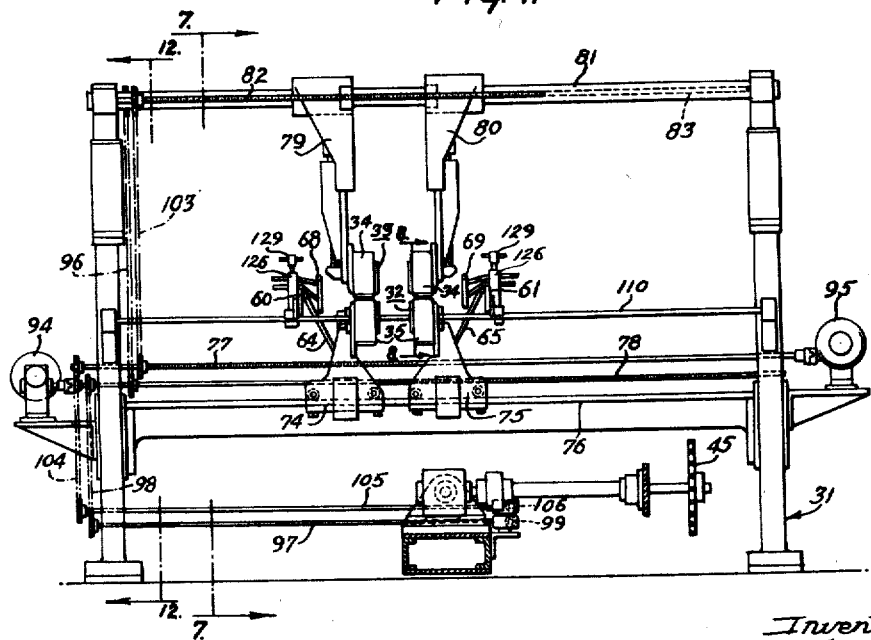

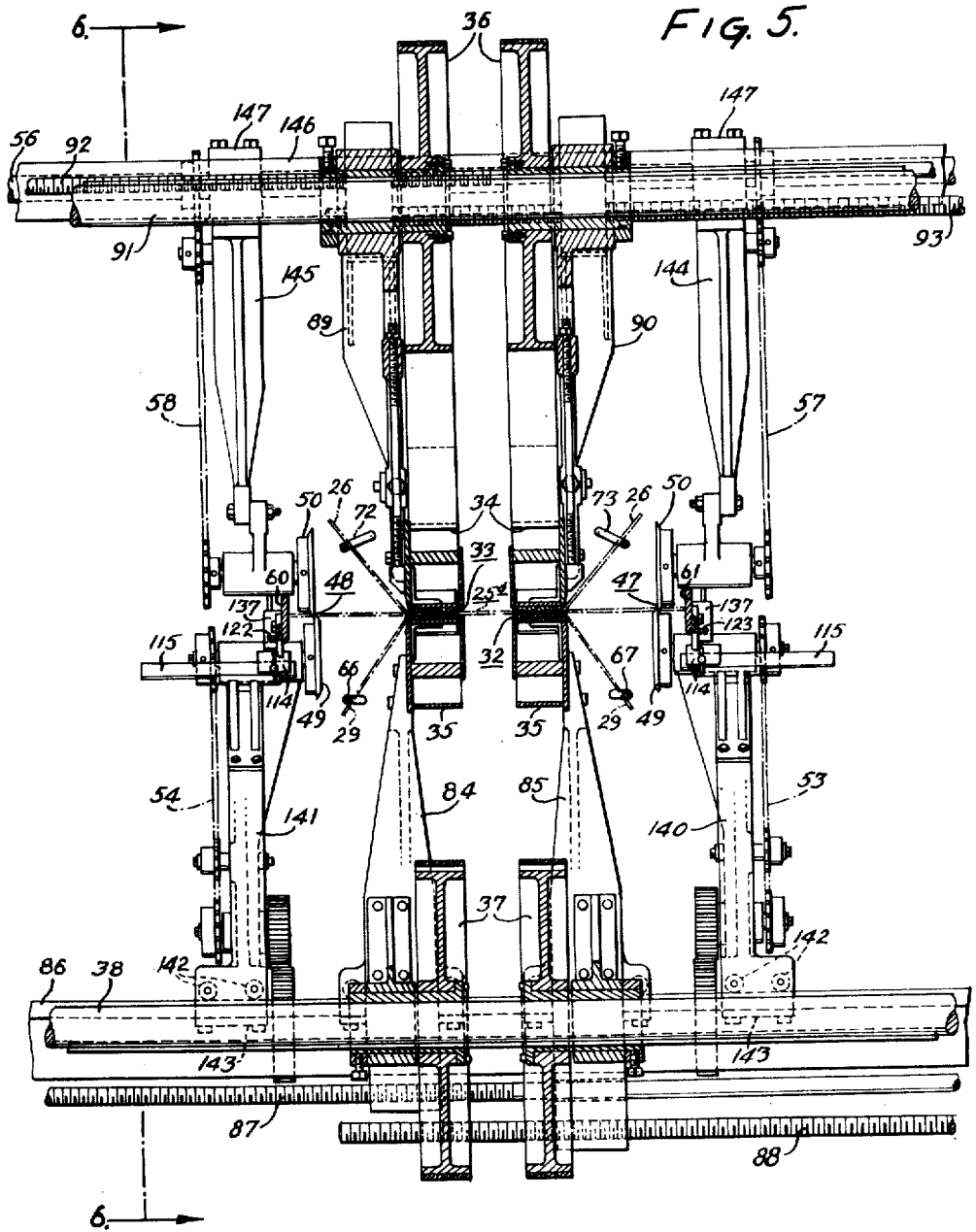

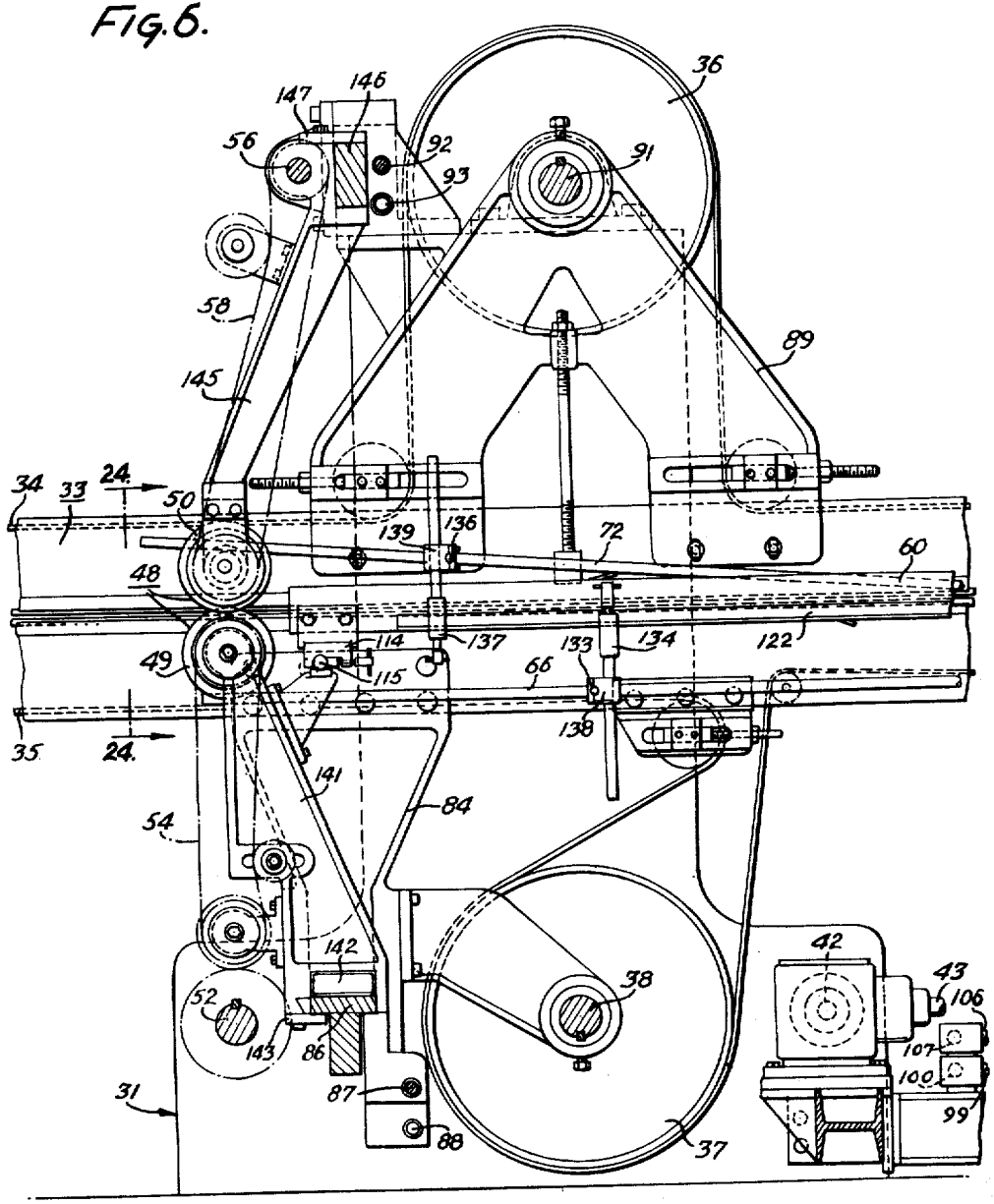

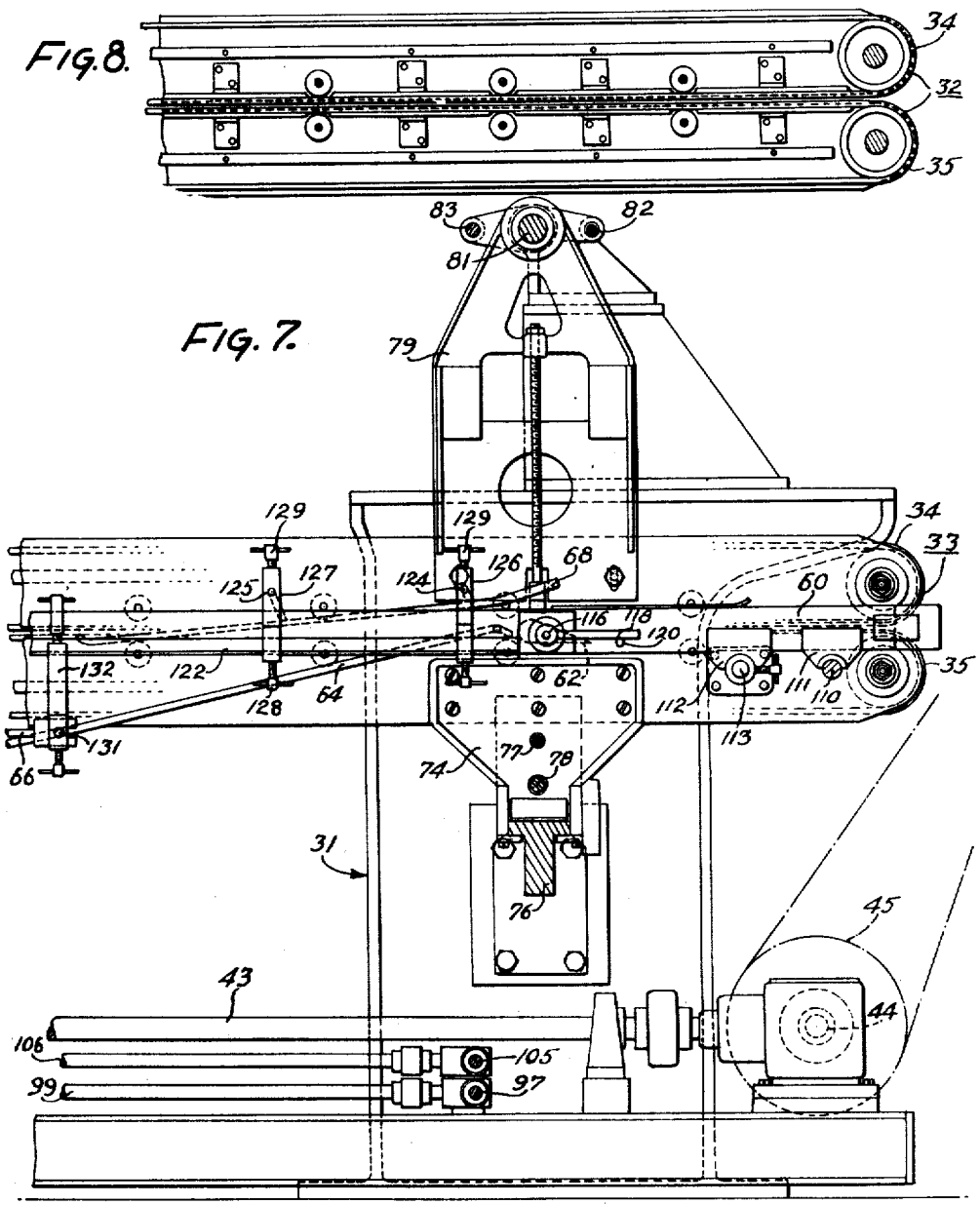

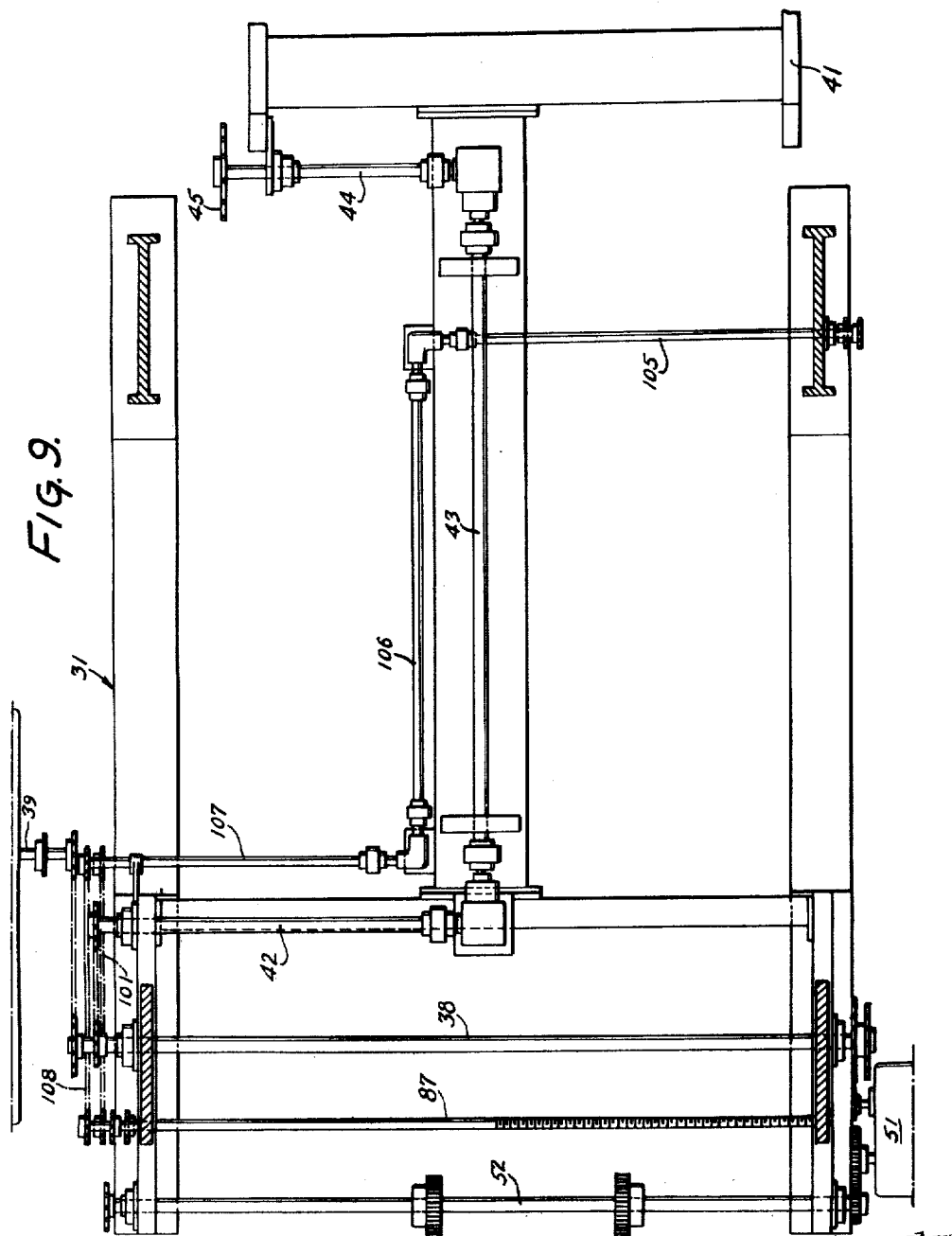

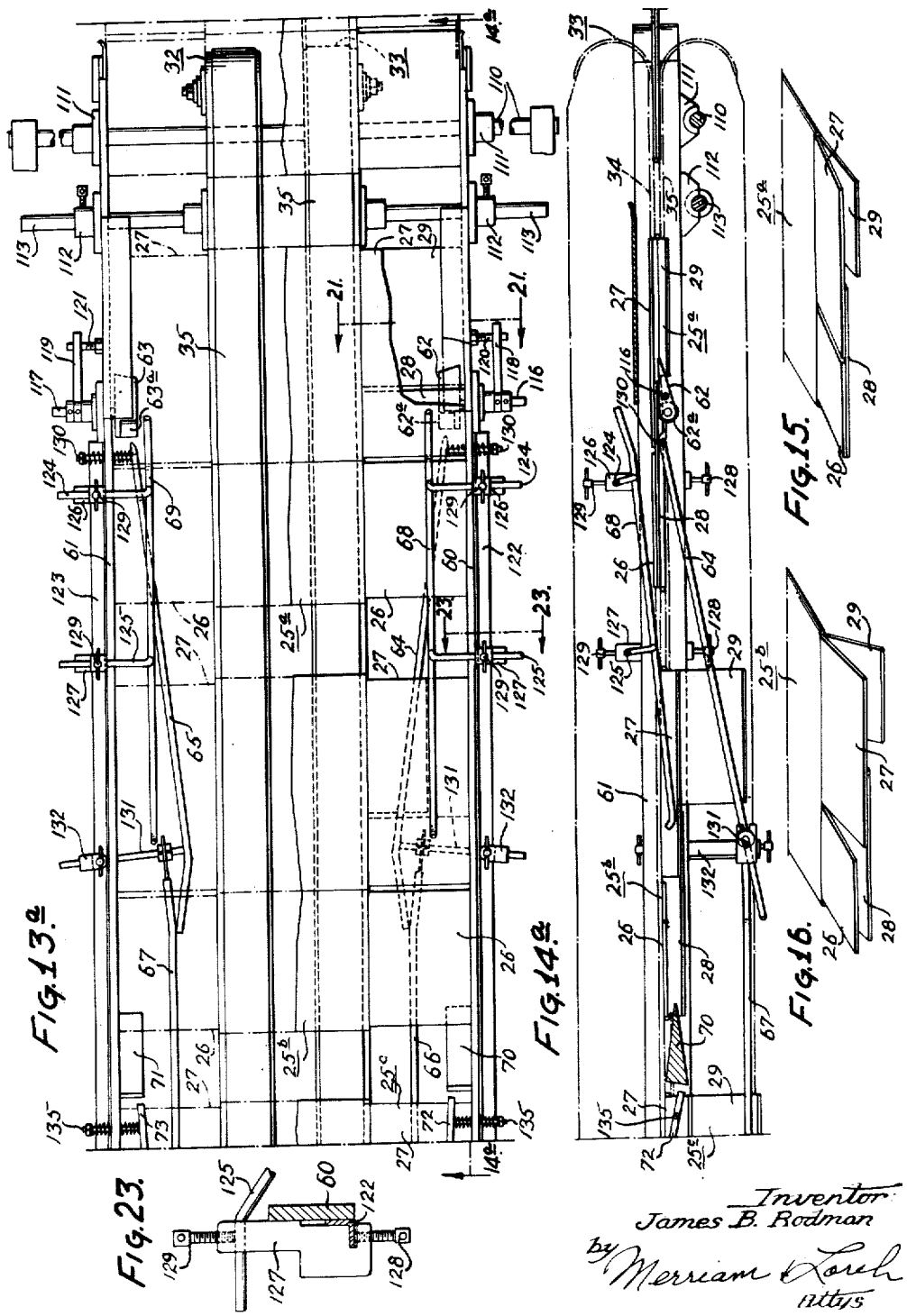

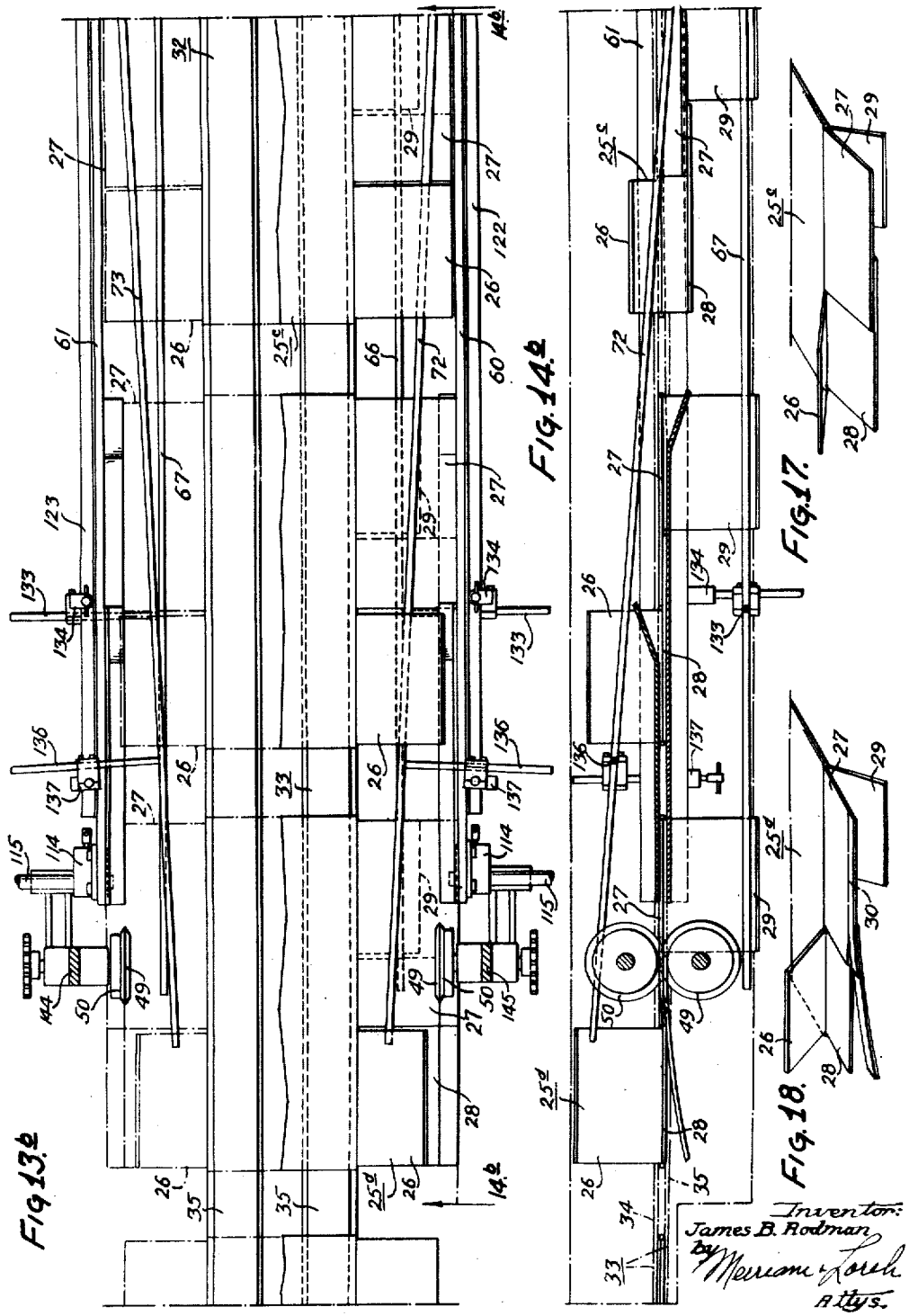

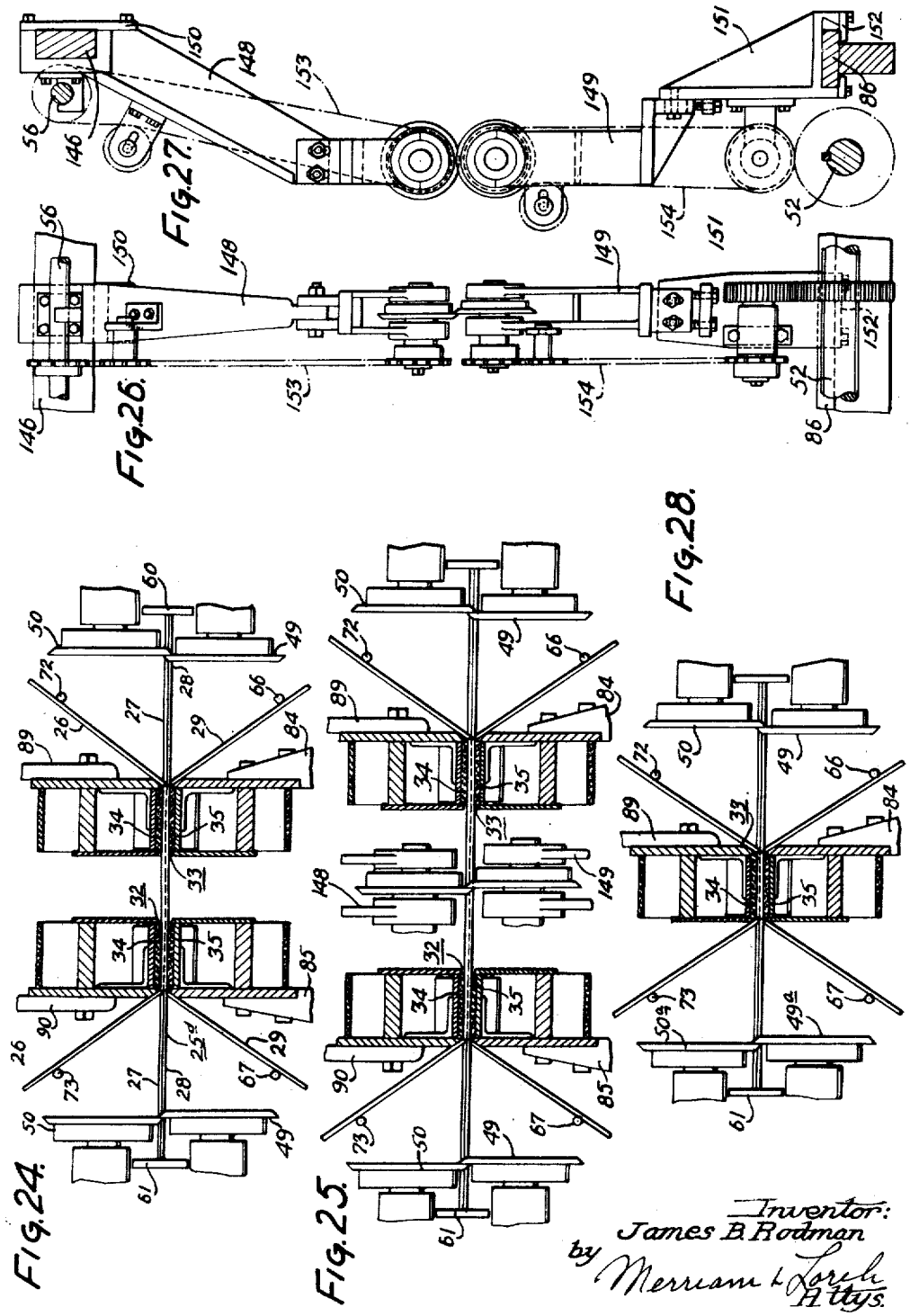

United States Patent Office 2,807,197
Patented Sept. 24, 1957

2,807,197
APPARATUS FOR CUTTING FLATTENED CONTAINERS

James B. Rodman, Burlington, N. J., assignor to Kieckhefer Container Company, a corporation of Delaware Continuation of application Serial No. 488,926, February 17, 1955. This application December 5, 1956, Serial No. 626,539

29 Claims. (Cl. 93—58.4)

This invention is a continuation of my prior application Serial No. 488,926, filed February 17, 1955, entitled "Apparatus for Cutting Flattened Containers," and has to do with the manufacture of containers formed of cardboard or like material, such as solid fibre, or corrugated board. Such containers are generally of rectangular form comprising a body portion that forms the container walls and end portions or flaps hinged to the body portions. As customarily made, for example as by the machine of the character disclosed in the U. S. Patent No. 2,637,251, issued May 5, 1953, to Francis J. Spiess, the containers are in flattened or knocked-down condition. More particularly this invention relates to flap cutters for cutting flaps on flattened folded boxes in which the box is rectangular as distinguished from square and having flaps of unequal length, there being first a long flap and then a short flap, or vice versa. That is, in a collapsed folded box there are four flaps, two in each layer, i. e. one long and one short flap in each layer with the long flap in one layer overlapping the entire short flap in the other and also overlying part of the long flap. The words "overlapping" and "overlying" are here used regardless of which layer is physically above the other at any particular moment. These flaps are all of equal width as formed but in order to form the proper end closure for the box, i. e. with the ends of the flaps abutting, the width of the long flaps must be reduced. In the finished box the short flaps are half as wide as the long flaps are long and the long flaps are only half as wide as the short flaps are long. In other words, when folded, the long flaps between them span the short side and meet in the center, and the short flaps span the long side, and meet in the center of it.

This invention solves the problem of automatically cutting the long flaps to a width less than the short flaps while the folded boxes are being passed at rates of many thousand per hour through the machine. Previously, the means for flap cutting involved slow and tedious handling of the boxes, whereas the present mechanism does the entire job while the folded boxes are passing through the device at the above rates, and does not require that the boxes be handled in any way except to feed them into the machine. This is accomplished by using the long flap in one or both layers of the folded container as an effective part of the machine. Inasmuch as the flaps are part of the container there is thus no problem of inserting and removing a holding mechanism in the machine as would be the case if the long flaps themselves were not availed of for this purpose.

In the preferred form of the invention the containers are introduced to the mechanism with the long flap as the leading flap in the lower fold or layer of the flattened container. A member is provided which is engaged by this leading long flap which is moved upwardly. Inasmuch as the long flap in the lower layer is below both the short flap in the upper layer and part of the long flap in the upper layer, this upward movement moves all but the short flap in the lower layer out of the plane of the advancing container. When this flap is thus segregated it is engaged by another guide and spread, preferably so that it is at an angle of about 90 degrees to the body of the container.

The other flaps are then released and return to the plane of the container. Then, as the container advances, it engages a finger which presses upon the leading short flap in the upper layer and moves it and the underlying long flap down, say 30 degrees. This finger will then also contact the upper trailing long flap and as the container moves forward the short upper flap will ultimately pass out from under the finger. When this happens the natural resiliency of the paperboard will cause the short upper flap to spring back toward its original position while the upper long flap together with the underlying larger flap are still being held down by the finger. While so separated the upper short flap is engaged by a wedge or spreader and moved upwardly, preferably to an angle of about 90 degrees. It will be noted that the lower long flap does not also spring upwardly because the upper long flap acts as an extension of the holding wedge and holds down this flap, even after the wedge itself no longer overlies the lower long flap.

Some cardboard containers have upper and lower sections which interfit in telescopic relation and this invention provides for the central slitting of a flattened container where it is desired to form two such sections from a single formed container.

Other novel features of the invention will be apparent from the following detailed description with reference to the accompanying drawings, in which:

Fig. 1 is a plan view of an apparatus or machine embodying the present invention;

Fig. 2 is a side elevational view of the machine;

Fig. 3 is an end elevational view taken from the discharge end of the machine;

Fig. 4 is a sectional view taken on line 4—4 of Fig. 2;

Fig. 5 is a relatively large scale sectional view taken on line 5—5 of Fig. 1;

Fig. 6 is a sectional view taken on line 6—6 of Fig. 5;

Fig. 7 is a relatively large scale sectional view taken on line 7—7 of Fig. 4;

Fig. 8 is a partial longitudinal sectional view on line 8—8 of Fig. 4, showing the conveyor belts for moving the flattened containers;

Fig. 9 is a relatively large scale sectional view taken on the line 9—9 of Fig. 2;

Fig. 10 is a sectional view taken on line 10—10 of Fig. 3;

Fig. 11 is a sectional view taken on line 11—11 of Fig. 3;

Fig. 12 is a sectional view taken on line 12—12 of Fig. 4;

Figs. 13a and 13b together comprise an enlaged plan view of that portion of the apparatus which performs the flap-deflecting and flap-cutting operations;

Fig. 14a is a view taken on line 14a—14a of Fig. 13a;

Fig. 14b is a view taken on line 14b—14b of Fig. 13b;

Figs. 15 to 18 are perspective views showing flattened containers at different stages of the flap-deflecting and flap-cutting operations;

Figs. 19 and 20 are views illustrating the manner in which the first flap-deflecting operation is performed;

Fig. 21 is a sectional view taken on line 21—21 of Fig. 13a;

Fig. 22 is a perspective view of one of the flap deflecting elements;

Fig. 23 is a sectional view taken on line 23—23 of Fig. 13a;

Fig. 24 is a relatively large scale sectional view taken on line 24—24 of Fig. 6 showing more clearly how some of the flaps are deflected while others are cut;

Fig. 25 is a view similar to Fig. 24 showing the use of a central cutter or slitter to divide the flattened container into two sections when it is desired to produce a container of the telescopic type;

Fig. 26 is a front view of the central slitter;

Fig. 27 is a side view of the same; and

Fig. 28 is a view similar to Fig. 24 showing the use of a single conveyor unit when containers of shallow depth are to be formed.

The drawings illustrate in detail a complete machine which has been used successfully for the purposes of the present invention. Many of the mechanical details of the machine are of no particular interest, and it will suffice to describe the machine only to the extent necessary to afford a clear understanding of the invention.

It is thought that a clear understanding of the principal purpose and functioning of the machine may best be had by first referring to Figs. 15 to 18 which show flattened containers 25a to 25d at different stages of progression through the machine. In these figures, only a portion of the flattened container is shown which comprises the central body portion and flaps on overlying sides of one end thereof. In the illustrations, the flaps of one end only of the carton are shown, but it will be understood that there are similar flaps on the opposite end of the body portion. In passing through the machine, the flaps on each side of the flattened container are disposed as shown, there being a small upper leading flap 26, a large upper following flap 27, a large lower leading flap 28, and a small lower following flap 29. As each flattened container moves through the machine, the small flaps 26 and 29 are separated from the large flaps 27 and 28, and the large flaps are cut while the small flaps are held separated therefrom. The necessity for cutting the large flaps arises from the fact that these flaps will extend widthwise or across the shorter dimension of the rectangular container, and therefore, it is necessary to cut them in order that they will not overlap, assuming that it is desired to have the small flaps as well as the large flaps abut when the container is closed.

As each flattened container progresses through the machine, the flap 29 is first separated from the other flaps as shown in Fig. 15 and is deflected downwardly and held in a fully deflected position. The other flaps are then temporarily depressed and the flap 26 is first released to effect its separation by reason of its springing back to horizontal position as shown in Fig. 16. While it is thus separated, flap 26 is deflected upwardly and is held in fully deflected position as shown in Figs. 17 and 18. The manner in which the flap separating and deflecting operations are performed will be described in detail later. At the stage illustrated in Fig. 17, the two small flaps 26 and 29 have been separated and deflected, and the large flaps 27 and 28 have been permitted to return to horizontal position. These latter flaps are guided in that position as they undergo the cutting operation as shown in Fig. 18, the line of cut being represented by the broken line 30.

Referring now to the general structure of the machine as shown particularly in Figs. 1 to 8, the stationary framework of the machine is designated generally by reference numeral 31. The flattened containers are carried through the machine from right to left as viewed in Figs. 1 and 2, preferably by means of cooperating endless belt conveyors which frictionally engage the upper and lower surfaces of the central body portion of each flattened container, leaving the flaps on each side free for deflection. In the machine illustrated, there are two such conveyors 32 and 33, each comprising an upper belt 34 and a lower belt 35. These belts extend respectively about pulleys 36 and 37 through which they are driven. Adjustable tensioning devices which are not of particular interest are provided in association with each of the belts. Pulley 37 is driven through shaft 38 (see Fig. 9) from a power-operated drive shaft 39. Pulley 36 is driven from shaft 38 through the chain and gear drive designated generally by reference numeral 40.

The flattened containers are fed to the machine from a known form of feeding device designated generally by reference numeral 41, which device is driven from shaft 38 (see Fig. 9) through shafts 42, 43, and 44 which are interconnected by encased bevel gears. The power take-off for the feeding device is at the driven sprocket 45. As we are not here concerned with the feeding device, detailed description thereof is unnecessary and it suffices to note that this device feeds flattened containers successively to the machine from a stack shown at 46 in Fig. 2. Obviously, the flattened containers could be fed by hand.

The flap-cutting on the opposite ends of each flattened container is performed by the cutting devices designated generally by reference numerals 47 and 48 (see Fig. 3). Each of these devices comprises a lower cutting wheel 49 and an upper cutting wheel 50 which are power driven from a power source 51. The lower cutting wheels are driven from shaft 52 through gear and chain drives represented generally by reference numerals 53 and 54. The upper cutting wheels are driven from shaft 52 through chain drive 55, shaft 56, and chain drives 57 and 58. As may be seen in Figs. 1 and 2, a transverse conveyor 59 serves to catch the falling pieces which are cut from the flaps, while the flattened containers with cut flaps are fed to a conveyor 59a.

Considering now in greater detail the manner in which the flap-deflecting and flap-cutting operations are performed, reference is made particularly to Figs. 13a and 13b and 14a and 14b. In considering these figures, Figs. 13a and 14a should be placed to the right of Figs. 13b and 14b. The flattened containers move from right to left. As each flattened container is carried along by the belt-conveying means, it passes between guide bars 60 and 61 which extend substantially the full length of the machine. These guide bars are normally stationary but they are adjustable as to their transverse spacing to accommodate different sized flattened containers as hereinafter described. As each flattened container passes between the guide bars 60 and 61, the flap-deflecting operations are performed, preparatory to the flap-cutting operation, by the elements now to be described. At the opposite sides of the path traversed by each flattened container, and located near the beginning of said path, are wedges 62 and 63 which are preferably pivoted and normally gravitate to the position shown in Fig. 19 and shown in dotted outline in Fig. 20. The wedges have rollers 62a and 63a thereon (see Fig. 22). As the forward end of each flattened container encounters the wedges, the undersurfaces of the leading flaps 28, which underly flaps 26 and 27, engage the wedges and the flaps 26, 27, and 28 (see Fig. 15) are slightly raised by the wedges. At the same time the wedges are caused to rotate about their pivots to the solid line position of Fig. 20. By the time the following or trailing small flap 29, which underlies flap 27, on each side of the flattened container reaches the wedge, the latter has its pointed end directed for entry between the flap 29 and the slightly-raised overlying large flap 27. The wedge effectively pries the flap 29 downwardly away from the flap 27, as shown in Figs. 20 and 21. Fig. 15 shows the condition on each side of the flattened container at this stage of its progression through the machine, the flap 29 being deflected somewhat downwardly from the general horizontal plane of the flattened container.

As the flattened container moves further toward the cutting devices 47 and 48, the trailing flap 29 on each side of the container is further deflected downwardly by deflecting rods 64 and 65, and is then held in fully deflected position by rods 66 and 67. Figs. 16 to 18 show the process of deflection of the flap 29. In the meantime, the upper leading small flap 26 on each side of the flattened container is separated and deflected upwardly. After the initial deflection of flap 29, as shown at the right side of Fig. 14a, the forward edges of the flaps on each side of the flattened container come into engagement with stationary deflecting rods 68 and 69. Each of these rods depresses the other three flaps 26, 28, and 27 on each side of the flattened container from their normal horizontal plane. As the small upper flap 26 on each side of the flattened container passes from engagement with the associated deflecting rod it is released and springs back to the horizontal position by reason of the resiliency of the cardboard material of which the flattened container is formed. Fig. 16 shows the condition on each side of the flattened container at this time with flap 29 being substantially deflected downwardly, flaps 27 and 28 being deflected downwardly to a lesser extent because flap 27 is under rod 68 and overlies flap 28, and flap 26 being disposed in the normal horizontal plane due to its resiliency and being separated from the underlying flap 28.

While the flaps 27 and 28 are still held depressed, the small upper flaps 26 engage and are deflected upwardly by stationary wedges 70 and 71. Fig. 14a shows how each of the upper flaps 26 comes into engagement with the stationary wedge for upward deflection thereby. The depressed large flaps 27 and 28 pass beneath the stationary wedges 70 and 71, and after passing the stationary wedges, these large flaps are permitted to return to their normal horizontal position and they pass between guides as shown in Fig. 14b. In the meantime, the upper small flaps 26 on the opposite sides of the flattened container are further deflected upwardly by deflecting rods 72 and 73, and are held in fully deflected position by these rods. Figs. 17 and 18 show the condition on each side of the flattened container in the latter stages of its progression through the machine.

With the small flaps 26 and 29 deflected upwardly and downwardly respectively, and with the large flaps 27 and 28 in horizontal position, as shown in Fig. 18, the flattened container is fed to the flap-cutting devices 47 and 48. These devices cut the large flaps 27 and 28 along a predetermined line as represented at 30 in Fig. 18, so as to reduce these flaps to the desired size.

From the foregoing description, it will be seen that the apparatus provided by this invention is novelly characterized in that it comprises a combination of elements for performing in sequence the operations above described. Such combination comprises means for separating and initially deflecting one of the small flaps in one direction out of the plane of the flattened container, means for temporarily deflecting the other flaps in the same direction and first releasing the other small flap to effect separation of the latter, means for deflecting said other small flap in the opposite direction out of said plane, and means for cutting the large flaps while the small flaps are in deflected positions.

In a machine of the character here involved, it is desirable to be able to make adjustments to accommodate different sized flattened containers and also to accommodate flattened containers having different relative sizes of the central body portion and the flap portions. Therefore, it is desirable that the belt conveyors, the side guide bars, the flap-deflecting elements, and the flap-cutting devices shall all be adjustable transversely of the machine.

As may be seen in Fig. 4, the belt-supporting members at the input end of the machine comprise lower brackets 74 and 75 which are movably supported for transverse movement on a supporting rail 76 and which are adapted to be actuated respectively by screw shafts 77 and 78. Upper brackets 79 and 80 at the same end of the machine are slidably mounted on a transverse rod 81 and are adapted to be actuated by screw shafts 82 and 83.

As may be seen in Fig. 5, the belt-supporting members at the discharge end of the machine comprise lower brackets 84 and 85 which are slidably mounted for transverse movement on rail or track 86 and are adapted to be actuated respectively by screw shafts 87 and 88. The upper brackets 89 and 90 at the same end of the machine are mounted for transverse movement on rod 91 and are adapted to be actuated respectively by screw shafts 92 and 93.

Looking lengthwise of the machine from the input end, as in Fig. 4, the left-hand and right-hand brackets which support the belts are motor-operable through their respective screws from two motors 94 and 95. Motor 94 drives screw shaft 78 to which screw shaft 83 is connected through chain drive 96. The driven screw shaft 78 is also connected to a shaft 97 through chain drive 98. Shaft 97 is also connected to a shaft 97 through chain drive 98. Shaft 97 is geared to a longitudinal shaft 99, which in turn is geared to a shaft 100 near the discharge end of the machine. The latter shaft is connected by chain drive 101 to screw shaft 88, which in turn is connected through chain drive 102 to screw shaft 93.

Motor 95 drives screw shaft 77 which is connected to screw shaft 82 through chain drive 103. Screw shaft 77 is also connected through chain drive 104 to a transverse shaft 105 which is geared to a longitudinal shaft 106. The latter in turn is geared to a transverse shaft 107 which is connected through chain drive 108 to screw shaft 87. The latter is connected through chain drive 109 to screw shaft 92.

Referring to the mounting of the guide bars 60 and 61, at the input end of the machine, these bars are slidably supported by the transverse rod 110. As may be seen in Fig. 7, each of the guide bars has a plate 111 secured thereto which is recessed to seat on the rod 110. As also shown in Fig. 7, each of the guide bars has a clamp 112 secured thereto, and the clamp engages a stud 113 projecting from the side of the associated conveyor structure. At the discharge end of the machine, as shown in Figs. 5 and 6, each of the guide bars has a clamp 114 secured to it, and the clamp engages a rod 115 carried by the cutter assembly. Loosening of the clamp permits relative movement between the guide bar and the cutter assembly.

The flap-deflecting elements hereinbefore described are all carried by the guide bars 60 and 61. The movable wedges 62 and 63 (Fig. 13a) are mounted on studs 116 and 117 which are rotationally supported by the guide bars. The studs carry arms 118 and 119 which help to gravitationally bias the wedges and are engageable with fixed stops 120 and 121. The fixed wedges 70 and 71 are directly secured to the guide bars. As may be seen in Fig. 5, the guide bars have angle supports 122 and 123 secured along their length, thus providing a flange on each guide bar for supporting the deflecting rods. As shown in Fig. 13a, each of the deflecting rods 68 and 69 has arms 124 and 125 by which it is supported by posts 126 and 127 which are mounted on the supporting flange. As shown in Fig. 23, each post is secured to the supporting flange by a screw 128, and each arm is secured to its post by a screw 129. Each of the deflecting rods 64 and 65 has an arm 130 at its forward end which is spring mounted to the associated guide bar, and has an arm 131 at its other end supported by a post 132 mounted on the supporting flange. Each of the deflecting rods 66 and 67 has its forward end secured to arm 131 and has an arm 133 at its other end by which it is supported by post 134 mounted on the supporting flange. Each of the deflecting rods 72 and 73 has an arm 135 at its forward end which is spring mounted to the associated guide bar, and an arm 136 at its other end supported by post 137 which is mounted on the supporting flange. As may be seen in Fig. 6, the ends of the rods secured to the posts 134 and 137 are secured thereto by means of adjustable clamps 138 and 139. In this way, the rods are adjustable to permit adjustment of the degree of deflection of the small flaps.

As shown in Figs. 3 and 6, the cutting devices 47 and 48 are mounted for adjustment transversely of the machine. The lower supports 140 and 141 of these devices are supported on the transverse rail 86 and are provided with rollers 142 to facilitate movement along the rail. Each support is held in adjusted position by a clamping plate 143, as may be seen in Fig. 6. The upper supports 144 and 145 for the cutting devices are supported on a transverse rail 146. Each support is held in adjusted position by a clamping plate 147. Transverse adjustment of the cutting devices is effected by loosening the clamping plates and moving the supports along the supporting rails.

As mentioned at the outset, where telescopic containers are being made, it is necessary to slit each flattened container centrally to divide it into two sections. This may be accomplished in the present machine by employing central slitting means as shown in Fig. 25. Such slitting means comprises cutter-carrying supports 148 and 149. As shown in Figs. 26 and 27, the upper support 148 is mounted on transverse rail 146 and is held in position by a clamp 150. The lower support 149 is mounted on rail 86 by means of bracket 151 having an associated clamping plate 152. The two supports 148 and 149 are removably mountable on the rails 146 and 86. The upper cutting element is driven from shaft 56 through chain drive 153. The lower cutting element is driven from shaft 52 through chain drive 154.

By means of the machine above described, it is possible to cut the large flaps on either end or on both ends of a flattened container, with or without the center slitting. It is also possible to center slit the flattened container with or without the flap cutting. This is because the flap cutters are individually adjustable and therefore either or both may be moved to ineffective position, and the central slitting means may be inserted or removed.

In some instances one-piece containers are made which are of shallow depth when finished. Fig. 28 shows the use of only one of the belt conveyors to grip the narrow central portion of such a flattened container.

While a preferred embodiment of a machine embodying the invention has been illustrated and described, it will be apparent that various modifications of the machine are possible particularly with respect to design and construction of the various parts. It will be understood, therefore, that the invention is not limited to the illustrated embodiment but contemplates such modifications as may occur to those skilled in the art.

I claim:

1. In an apparatus for cutting the large flaps of a flattened rectangular container having a central body portion and large and small flaps on at least one end thereof; means extending lengthwise of the apparatus and engageable with said flattened container to move the latter through the apparatus; means for deflecting the small flaps out of the plane of the flattened container as it is moved by said conveyor; and means for cutting the large flaps while the small flaps are in deflected positions.

2. In an apparatus for cutting the large flaps of a flattened rectangular container having a central body portion and large and small flaps on each end thereof; endless belts extending lengthwise of the apparatus and engageable with the upper and lower surfaces of said central body portion to move the flattened container through the apparatus; means for deflecting the small flaps out of the plane of the flattened container as it is moved by said belts; and means for cutting the large flaps while the small flaps are in deflected positions.

3. In an apparatus for handling rectangular flattened paper board containers having sides of unequal length and having a flap on each side, the flaps lying in two adjacent layers, one superposed on the other, with a short flap overlying a long flap and a long flap overlapping a short flap and part of a long flap which comprises; a conveyor for moving the flattened containers in a predetermined path with the flaps at one edge; means for moving the long leading flap toward the leading short flap whereby both leading flaps and the trailing long flap are diverted, leaving the trailing short flap separated therefrom; means for spreading the trailing short flap; means for moving the leading small flap and the trailing long flap against the leading long flap; means for first releasing the short flap whereby it separates itself from the trailing long flap because of its natural resilience; means for spreading the thus separated leading short flap; and means for holding both long flaps in a position away from the last mentioned spreading means.

4. In an apparatus for handling rectangular flattened paper board containers having sides of unequal length and having a flap on each side, the flaps lying in two adjacent layers one superposed on the other, with a short flap overlying a long flap and a long flap overlapping a short flap and part of a long flap which comprises; a conveyor for moving the flattened containers in a predetermined path with the flaps at one edge; means for moving the long leading flap toward the leading short flap whereby both leading flaps and the trailing long flap are diverted, leaving the trailing short flap separated therefrom; means for spreading the trailing short flap; means for moving the leading small flap and the trailing long flap against the leading long flap; means for first releasing the short flap whereby it separates itself from the trailing long flap because of its natural resilience; means for spreading the thus separated leading short flap; means for holding both long flaps in a position away from the last mentioned spreading means; and means for cutting the long flaps while the short flaps are spread.

5. In an apparatus for handling rectangular flattened paper board containers having sides of unequal length and having a flap on each side, the flaps lying in two adjacent layers one superposed on the other, with a short flap overlying a long flap and a long flap overlapping a short flap and part of a long flap which comprises; a conveyor for moving the flattened containers in a predetermined path with the flaps at one edge; means for moving the long leading flap toward the leading short flap whereby both leading flaps and the trailing long flap are diverted, leaving the trailing short flap separated therefrom; means for spreading the trailing short flaps; means for moving the leading small flap and the trailing long flap against the leading long flap; means for first releasing the short flap whereby it separates itself from the trailing long flap because of its natural resilience; means for spreading the thus separated leading short flap; means for holding both long flaps in a position away from the last mentioned spreading means; and means for cutting the container through the center of the body as it is moved through the apparatus.

6. In an apparatus for handling rectangular flattened paper board containers having sides of unequal length and having a flap on each end of each side, the flaps on each end lying in two adjacent layers, one superposed on the other, with a short flap overlying a long flap and a long flap overlapping a short flap and a part of a long flap, which comprises a conveyor for moving the flattened containers in a predetermined path with the flaps at each edge; means for moving the long leading flaps toward the leading short flaps whereby the leading flap and the trailing long flap on each end of the body are diverted, leaving the trailing short flaps separated therefrom; means for spreading the trailing short flap on each end of the body; means for moving the leading small flap and the trailing long flap on each end against the leading long flap on each end; means for first releasing the short flap on each end whereby they separate themselves from the trailing long flaps because of their natural resilience; means for spreading the thus separated leading short flaps; and means for holding the long flap on each end in a position away from the last mentioned spreading means on each end.

7. In an apparatus for cutting the large flaps on at least one end of a flattened rectangular container having a body portion, two large flaps, and two small flaps on said end thereof; means engageable with the container for moving the flattened container substantially in a plane; means for deflecting one of the small flaps in one direction out of said plane; means for temporarily deflecting the other flaps in the same direction and first releasing the other small flap to effect a separation of the latter; means for deflecting said other small flap in the opposite direction out of said plane; and means for cutting the large flaps while the small flaps are in deflected positions.

8. In an apparatus for cutting the large flaps on each end of a flattened rectangular container having a central body portion, two large flaps and two small flaps on each end thereof; means engageable with the central body portion for moving the flattened container substantially in a plane; means for deflecting one of the small flaps of each end in one direction out of said plane; means for temporarily deflecting the other flaps of each end in the same direction and first releasing the other small flap of each end to effect separation of the latter; means for deflecting said other small flap of each end in the opposite direction out of said plane; and means for cutting the large flaps while the small flaps are in deflected positions.

9. In an apparatus for cutting the large flaps on each end of a flattened rectangular container having a central body portion, two large flaps, and two small flaps on each end thereof; means engageable with the central body portion for moving the flattened container substantially in a plane; means for initially deflecting one of the small flaps of each end in one direction out of said plane; means for further deflecting said small flaps in the same direction and for holding them in deflected position; means for temporarily deflecting the other flaps of each end in the same direction and first releasing the other small flaps to effect separation of the latter; means for deflecting said other small flaps in the opposite direction out of said plane; means for further deflecting said other small flaps in said opposite direction and for holding them in deflected positions; and means for cutting the large flaps while the small flaps are in deflected positions.

10. In an apparatus for cutting the large flaps on each end of a flattened rectangular container having a central body portion, two large flaps, and two small flaps on each end thereof; means engageable with the central body portion for moving the flattened container substantially in a plane, there being a small flap leading and a small flap following on each end of the moving flattened container; means for initially deflecting said following small flap of each end in one direction out of said plane; means for temporarily deflecting the other flaps of each end in the same direction and first releasing the leading small flaps to effect separation of the latter; means for deflecting said leading small flap of each end in the opposite direction out of said plane; and means for cutting the large flaps while the small flaps are in deflected positions.

11. In an apparatus for cutting the large flaps on each end of a flattened rectangular container having a central body portion, two large flaps, and two small flaps on each end thereof; means engageable with the central body portion for moving the flattened container substantially in a plane, there being a small flap leading and a small flap following on each end of the moving flattened container; means for initially deflecting the following small flap of each end in one direction out of said plane; means for further deflecting said following small flaps in the same direction and for holding them in deflected positions; means for temporarily deflecting the other flaps of each end in the same direction and first releasing said leading small flaps of each end to effect separation of the latter; means for deflecting said leading small flaps in the opposite direction out of said plane; means for further deflecting said leading small flaps in said opposite direction and for holding them in deflected positions; and means for cutting the large flaps while the small flaps are in deflected positions.

12. In an apparatus for cutting the large flaps on each end of a flattened rectangular container having a central body portion, two large flaps, and two small flaps on each end thereof; means engageable with the central body portion for moving the flattened container substantially in a plane, there being a small flap leading and a small flap following on each end of the moving flattened container; wedges engageable by the flaps, whereby upon entry of the wedge between said following small flaps and the adjacent large flap the former is deflected in one direction out of said plane; means for further deflecting said following small flaps in the same direction and for holding them in deflected positions; means for temporarily deflecting the other flaps of each end in the same direction and first releasing said leading small flaps of each end to effect separation of the latter; stationary wedges engageable by the separated leading small flaps to deflect them in the opposite direction out of said plane; means for further deflecting said leading small flaps in said opposite direction and for holding them in deflected positions; and means for cutting the large flaps while the small flaps are in deflected positions.

13. In an apparatus for cutting the large flaps on each end of a flattened rectangular container having a central body portion and large and small flaps on each end thereof; means engageable with the central body portion for moving the flattened container horizontally with a small upper flap leading and a small lower flap following on each end of the flattened container; means for initially deflecting and holding the small lower flaps downward; means for temporarily depressing the other flaps and first releasing the small upper flaps to effect separation of the latter; means for deflecting and holding said upper small flaps upward; and means for cutting the large flaps while the said small flaps are held in deflected positions.

14. In an apparatus for cutting the large flaps on each end of a flattened rectangular container having a central body portion and large and small flaps on each end thereof; means engageable with the central body portion for moving the flattened container horizontally with a small upper flap leading and a small lower flap following on each end of the flattened container; means for initially deflecting the small lower flap downward; means for further deflecting and holding said lower flap downward; means for temporarily depressing the other flaps and first releasing the small upper flaps to effect separation of the latter; means for deflecting and holding said upper flaps upward; and means for cutting the large flaps while the said small flaps are held in deflected positions.

15. In an apparatus for cutting the large flaps on each end of a flattened rectangular container having a central body portion and large and small flaps on each end thereof; means engageable with the central body portion for moving the flattened container horizontally with a small upper flap leading and a small lower flap following on each end of the flattened container; a pivoted wedge engageable by the flaps on each end and movable thereby to effect entry of the wedges between the small lower flap and the overlying large flap of each end to deflect the former downward; stationary means engageable by the deflected lower flaps to deflect them further to hold them in fully deflected positions; stationary means engageable by the upper flap surfaces to temporarily depress the other flaps and first release the small upper flaps of each end to effect separation of the latter from the large flaps; stationary means engageable by the separated upper flaps to deflect them upwardly and to hold them in fully deflected position; and means for cutting the large flaps while the small flaps are held in deflected positions.

16. In an apparatus for cutting the large flaps on each side of a flattened rectangular container having a central body portion and flaps on each end thereof; means engageable with the central body portion for moving the flattened container horizontally with a small upper flap leading and a small lower flap following on each end of the flattened container; a pivoted wedge engageable by the flaps upon each end and movable thereby to effect entry of the wedges between the small lower flap and the overlying large flap on each end to deflect the former downward; stationary means engageable by the deflected lower flaps to deflect them further and to hold them in fully deflected positions; stationary means engageable by the upper flaps to temporarily depress the other flaps and first release the small upper flaps to effect separation of the latter from the large flaps; a stationary wedge engageable by the separated upper flaps of each end to deflect them upwardly, stationary means engageable by the deflected upper flaps to deflect them further and to hold them in fully deflected position; and means for cutting the large flaps while the small flaps are held in deflected positions.

17. In an apparatus for centrally slitting a flattened rectangular container and for cutting the large flaps on each end thereof; the flattened container having a central body portion; two large flaps, and two small flaps on each end thereof; means engageable with the central body portion for moving the flattened container substantially in a plane; means for initially deflecting one of the small flaps of each end in one direction out of said plane; means for temporarily deflecting the other flaps of each end in the same direction and first releasing the other small flap of each end to effect separation of the latter; means for deflecting said other small flaps in the opposite direction out of said plane; means for cutting the large flaps while the small flaps are in deflected positions; and means for simultaneously centrally slitting the flattened rectangular container.

18. In an apparatus for centrally slitting a flattened rectangular container and for cutting the large flaps on each end thereof; the flattened container having a central body portion and large and small flaps on each end thereof; means engageable with the central body portion for moving the flattened container horizontally with a small upper flap leading and a small lower flap following on each end of the flattened container; means for initially deflecting the small lower flap of each end downward; means for further deflecting and holding said lower flap downward; means for temporarily depressing the other flaps of each end and first releasing the small upper flaps to effect separation of the latter; means for deflecting and holding said upper flaps upward; means for cutting the large flaps while the said small flaps are held in deflected positions; and means for centrally slitting the flattened rectangular container.

19. In an apparatus for cutting the large flaps on each end of a flattened rectangular container having a central body portion and large and small flaps on each end thereof; endless belts extending lengthwise of the apparatus and engageable with the upper and lower surfaces of said central body portion to move the flattened container horizontally with a small upper flap leading and a small lower flap following on each end of the flattened container; means for initially deflecting and holding the small lower flaps downward; means for temporarily depressing the other flaps of each end and first releasing the small upper flaps to effect separation of the latter; means for deflecting and holding said upper flaps upward; and means for cutting the large flaps while the said small flaps are held in deflected position.

20. In an apparatus for selectively cutting flaps of a flattened container having a central body portion and flaps on each end thereof; a pair of laterally adjustable side guides extending lengthwise of the apparatus; laterally adjustable endless belts extending lengthwise of the apparatus and engageable with the upper and lower surfaces of said body portion to move the flattened container between said guides; deflecting elements supported by said guides for deflecting flaps of the flattened container which are not to be cut; and laterally adjustable cutting devices for cutting the other flaps.

21. In an apparatus for centrally slitting a flattened rectangular container having spread flaps on each end of a central body; a pair of spaced lateral conveyor means extending lengthwise of the apparatus and engageable with the body portion for moving the flattened container through said apparatus, said lateral conveyor means being spaced and positioned to define the position of the container by engagement respectively with the bases of the spread flaps; and means for centrally slitting the flattened container as it is positioned and moved by said pair of conveyor means.

22. In an apparatus for centrally slitting a flattened container having a central body portion and spread flaps on each end thereof; laterally spaced endless belts extending lengthwise of the apparatus and engageable with the upper and lower surfaces of said central body portion on opposite sides of the longitudinal center of said portion, said belts being spaced and positioned to define the position of the container by engagement respectively with the bases of spread flaps; means for driving said belts to move the flattened container through the apparatus; and means for centrally slitting the flattened container as it is positioned and moved by said belts.

23. In an apparatus for handling rectangular flattened paper board containers having sides of unequal length and having a flap on each side, the flaps lying in two adjacent layers, one superposed on the other, with a short flap overlying a long flap and a long flap overlapping a short flap and part of a long flap; which comprises a conveyor for moving the flattened container in a predetermined path with the flaps at one edge of the path; an inclined wedge for engaging and moving the long leading flap towards the leading short flap, whereby both leading flaps and the overlapping trailing long flap are diverted from said path leaving the trailing short flap separated from the other flaps; inclined means for further moving the trailing short flap from said path; a second wedge for moving the leading small flap and the trailing long flap against the leading long flap, said wedge being of such size and positioned in the direction of said path to release the short flap while still engaging the long flap, whereby the short flap separates itself from the trailing long flap because of its natural resilience; means for further spreading the thus separated leading short flap from said path; and means for supporting both long flaps in said path.

24. In an apparatus for handling rectangular flattened paper board containers having sides of unequal length and having a flap on each side, the flaps lying in two adjacent layers, one superposed on the other, with a short flap overlying a long flap and a long flap overlapping a short flap and part of a long flap; which comprises a conveyor for moving the flattened container in a predetermined path with the flaps at one edge of the path; a pivoted inclined wedge for engaging and moving the long leading flap towards the leading short flap, whereby both leading flaps and the overlapping trailing long flap are diverted from said path leaving the trailing short flap separated from the other flaps; fixed inclined means for further moving the trailing short flap from said path; a second wedge for moving the leading small flap and the trailing long flap against the leading long flap, said wedge being of such size and positioned in the direction of said path to release the short flap while still engaging the long flap, whereby the short flap separates itself from the trailing long flap because of its natural resilience; means for further spreading the thus separated leading short flap from said path; and means for supporting both long flaps in said path.

25. The method of cutting the long flaps of a flattened paper board container which comprises continuously advancing in a substantially horizontal path; a flattened container having a contral body portion and a marginal area with a long and short flap in each of two superposed layers, the long flap being the leading flap in one layer and the short flap the leading flap in the other layer; first separating the trailing short flap from the remaining flaps; then separating the leading short flap from the remaining flaps; and cutting the long flaps while the short flaps are thus separated and the container is advancing in said path.

26. The method of cutting the long flaps of a flattened paper board container which comprises continuously advancing in a substantially horizontal path; a flattened container having a central body portion and a marginal area with a long and short flap in each of two superposed layers, the long flap being the leading flap in one layer and the short flap the leading flap in the other layer; deflecting the short flaps in the superposed layers from said horizontal path; supporting the long flaps in said horizontal path; and trimming the long flaps while so supported and moving with the short flaps deflected.

27. The method of handling rectangular flattened paper board containers which comprises; advancing in a substantially horizontal path a flattened paper board container comprising a central body portion and a marginal area having a long and short flap in each of two superposed layers, the long flap being the leading flap in one layer, and the short flap leading in the other; applying vertical pressure to the leading long flap whereby that flap and both of the flaps in the other layer are moved away from the trailing short flap producing a separation thereof; spreading the separated short flap; applying vertical pressure in the opposite direction to the remaining flaps to move them a substantial distance; releasing the pressure on the so-moved short flap first, whereby because of its natural resilience it snaps backwardly; then spreading this separated short flap.

28. The method of handling rectangular flattened paper board containers which comprises; advancing in a substantially horizontal path a flattened paper board container comprising a central body portion and a marginal area having a long and short flap in each of two superposed layers, the long flap being the leading flap in one layer, and the short flap leading in the other; applying vertical pressure to the leading long flap whereby that flap and both of the flaps in the other layer are moved away from the trailing short flap, producing a separation thereof; spreading the separated short flap; applying vertical pressure in the opposite direction to the remaining flaps to move them a substantial distance; releasing the pressure on the so-moved short flap first, whereby because of its natural resilience, it snaps backwardly; then spreading this separated short flap; and cutting marginal portions of the larger flaps while the short flaps are so spread.

29. In an apparatus for cutting flaps of a flattened container having a central body portion and flaps on each side thereof, endless belts extending lengthwise of the apparatus and engageable with the upper and lower surfaces of said central body portion to move the flattened container through the apparatus, and means for cutting flaps on each side of said central body portion without cutting the flap which normally lies against it in folded condition as the flattened container is moved by said belts.

References Cited in the file of this patent

UNITED STATES PATENTS

| | | |
|---|---|---|
| 658,024 | Smith | Sept. 18, 1900 |
| 2,349,204 | Staude | May 16, 1944 |

UNITED STATES PATENT OFFICE

CERTIFICATE OF CORRECTION

Patent No. 2,807,197 September 24, 1957

James B. Rodman

It is hereby certified that error appears in the printed specification of the above numbered patent requiring correction and that the said Letters patent should read as corrected below.

Column 2, line 58, for "enlaged" read -- enlarged --; column 6, lines 17 and 18, strike out "Shaft 97 is also connected to a shaft 97 through chain drive 98."; column 8, line 45, for "flaps" read -- flap --; column 13, line 3, for "contral" read -- central --.

Signed and sealed this 24th day of December 1957.

(SEAL)
Attest:

KARL H. AXLINE
Attesting Officer

ROBERT C. WATSON
Commissioner of Patents